United States Patent
Kim et al.

(10) Patent No.: US 12,289,401 B2
(45) Date of Patent: Apr. 29, 2025

(54) ARTIFICIAL INTELLIGENCE POST-QUANTUM ENCRYPTION METHOD AND ARTIFICIAL INTELLIGENCE POST-QUANTUM ENCRYPTION APPARATUS

(71) Applicant: AhnLab CloudMate Inc., Seoul (KR)

(72) Inventors: Keunjin Kim, Seoul (KR); Kyungmin Kim, Seoul (KR); Sungju Park, Seoul (KR)

(73) Assignee: AhnLab CloudMate Inc., Seoul (KR)

( * ) Notice: Subject to any disclaimer, the term of this patent is extended or adjusted under 35 U.S.C. 154(b) by 239 days.

(21) Appl. No.: 18/180,906

(22) Filed: Mar. 9, 2023

(65) Prior Publication Data
US 2023/0231705 A1    Jul. 20, 2023

Related U.S. Application Data

(63) Continuation of application No. PCT/KR2021/019347, filed on Dec. 17, 2021.

(30) Foreign Application Priority Data

Sep. 24, 2021   (KR) .................. 10-2021-0126203

(51) Int. Cl.
*H04L 9/08*   (2006.01)
*G06N 10/60*  (2022.01)
*H04L 9/06*   (2006.01)

(52) U.S. Cl.
CPC .......... *H04L 9/0852* (2013.01); *G06N 10/60* (2022.01); *H04L 9/0618* (2013.01); *H04L 9/0861* (2013.01)

(58) Field of Classification Search
CPC ............... H04L 9/0852; H04L 9/0618; H04L 9/0861; G06N 10/60
(Continued)

(56) References Cited

U.S. PATENT DOCUMENTS 8,194,858 B2 * 6/2012 Bukshpun ............ H04L 9/0891
                                                 380/278
8,712,040 B2 * 4/2014 Brothers ............... H04L 9/0618
                                                  380/37
(Continued)

FOREIGN PATENT DOCUMENTS

JP    2002-542523 A    12/2002
JP    2005-301464 A    10/2005
(Continued)

OTHER PUBLICATIONS

International Search Report issued in PCT/KR2021/019347; mailed Jun. 9, 2022.

*Primary Examiner* — Samson B Lemma
(74) *Attorney, Agent, or Firm* — Studebaker Brackett PLLC

(57) ABSTRACT

Disclosed is a data encryption method performed by an apparatus, which includes encrypting plaintext data based on an encryption key to generate first ciphertext data, applying a noise vector being periodically extracted to an artificial intelligence-based generative model to generate a first signature code and a second signature code, and applying the first signature code and the second signature code to the first ciphertext data to generate second ciphertext data. The generating of the first signature code includes determining a type and a replacement location of a character necessary to generate the first signature code by means of a predetermined conversion formula and generating a first character, which is obtained by calculating an existing encryption character being present at the replacement location in the first ciphertext data and the character in a predetermined scheme, as the first signature code.

9 Claims, 17 Drawing Sheets

(58) Field of Classification Search
USPC .......................................................... 380/28
See application file for complete search history.

(56) References Cited

U.S. PATENT DOCUMENTS

| | | | | |
|---|---|---|---|---|
| 8,870,084 | B2* | 10/2014 | Hamman | H04L 9/0869 |
| | | | | 235/494 |
| 10,009,169 | B2* | 6/2018 | Murray | G09C 1/00 |
| 10,594,480 | B2* | 3/2020 | Samid | H04L 9/0618 |
| 11,416,854 | B2* | 8/2022 | Zhang | G06Q 20/38215 |
| 2007/0064946 | A1* | 3/2007 | Ohkubo | H04L 9/0894 |
| | | | | 380/267 |
| 2010/0211787 | A1* | 8/2010 | Bukshpun | H04L 9/14 |
| | | | | 380/255 |
| 2011/0194687 | A1* | 8/2011 | Brothers | H04L 9/0668 |
| | | | | 380/28 |
| 2012/0250863 | A1* | 10/2012 | Bukshpun | H04L 9/065 |
| | | | | 380/278 |
| 2017/0048059 | A1* | 2/2017 | Murray | H04L 9/065 |

FOREIGN PATENT DOCUMENTS

| | | |
|---|---|---|
| JP | 2020-013561 A | 1/2020 |
| KR | 10-2006-0103360 A | 9/2006 |
| KR | 10-2019-0048104 A | 5/2019 |
| KR | 10-2020-0083929 A | 7/2020 |

* cited by examiner

➡ First input value  1 2 8 5

➡ Second input value  5 1 8 7

FIG. 10A

Determine replacement location of first signature code character $$\text{round}(\frac{1}{1+2+8+5} * 37) = 2$$

$$\text{round}(\frac{2}{1+2+8+5} * 37) + 2 = 7$$

$$\text{round}(\frac{8}{1+2+8+5} * 37) + 7 = 24$$

$$\text{round}(\frac{5}{1+2+8+5} * 37) + 24 = 36$$

FIG. 10B

| | | | | | | | | | | |
|---|---|---|---|---|---|---|---|---|---|---|
| 0 | 0 | 11 | B | 22 | M | 33 | X | 44 | i | 55 | t |
| 1 | 1 | 12 | C | 23 | N | 34 | Y | 45 | j | 56 | u |
| 2 | 2 | 13 | D | 24 | O | 35 | Z | 46 | k | 57 | v |
| 3 | 3 | 14 | E | 25 | P | 36 | a | 47 | l | 58 | w |
| 4 | 4 | 15 | F | 26 | Q | 37 | b | 48 | m | 59 | x |
| 5 | 5 | 16 | G | 27 | R | 38 | c | 49 | n | 60 | y |
| 6 | 6 | 17 | H | 28 | S | 39 | d | 50 | o | 61 | z |
| 7 | 7 | 18 | I | 29 | T | 40 | e | 51 | p | | |
| 8 | 8 | 19 | J | 30 | U | 41 | f | 52 | q | | |
| 9 | 9 | 20 | K | 31 | V | 42 | g | 53 | r | | |
| 10 | A | 21 | L | 32 | W | 43 | h | 54 | s | | |

FIG. 10C

Determine replacement location of second signature code character $$\text{round}(\frac{5}{5+1+8+7} * 37) = 9$$

$$\text{round}(\frac{1}{5+1+8+7} * 37) + 9 = 11$$

$$\text{round}(\frac{8}{5+1+8+7} * 37) + 11 = 25$$

$$\text{round}(\frac{7}{5+1+8+7} * 37) + 25 = 37$$

ARTIFICIAL INTELLIGENCE POST-QUANTUM ENCRYPTION METHOD AND ARTIFICIAL INTELLIGENCE POST-QUANTUM ENCRYPTION APPARATUS

CROSS-REFERENCE TO RELATED APPLICATIONS

The present application is a continuation of International Patent Application No. PCT/KR2021/019347, filed on Dec. 17, 2021, which is based upon and claims the benefit of priority to Korean Patent Application No. 10-2021-0126203 filed on Sep. 24, 2021. The disclosures of the above-listed applications are hereby incorporated by reference herein in their entirety.

BACKGROUND

Embodiments of the inventive concept described herein relate to a data encryption method using artificial intelligence post-quantum cryptography and a data encryption apparatus using the same.

Recently, as the amount of data has increased and complicated due to the rapid development and explosive growth of information and communication technology, "big data" has been presented as a solution for efficiently analyzing data within a given time. However, in a big data environment for processing large amounts of data, there is a risk in which personal privacy and human rights are violated as personal information is leaked. In addition, in a company system which exchanges and manages a great deal of information or a business to business transaction, there is a risk of leakage of trade secrets within the company as well as personal information of customers. To prevent it, many companies encrypt data including contents associated with personal information or trade secrets within the companies to generate and use ciphertext data.

In conjunction with such an encryption method, there are a prefix scheme and a postfix scheme, for including and using contents associated with encryption in a prefix portion and a postfix portion in the ciphertext data, as schemes which are generally used.

However, because the above-mentioned encryption scheme is a scheme generally performed in the encryption process, it is possible for the third party to perform inference based on location in ciphertext data. Particularly, information about encryption is leaked due to regularity indicated in an iterative encryption process, and personal information and trade secrets within company to be protected by persons and companies are eventually leaked.

Thus, there is a need for a method for including information about encryption in ciphertext data and simultaneously removing regularity indicated in an encryption process to disable the third party to perform inference, which deviates from the existing prefix scheme and the existing postfix scheme.

SUMMARY

The inventive concept provides a data encryption method using artificial intelligence post-quantum cryptography and a data encryption apparatus using the same.

The technical objects of the inventive concept are not limited to the above-mentioned ones, and the other unmentioned technical objects will become apparent to those skilled in the art from the following description.

In accordance with an aspect of the inventive concept, there is provided a data encryption method performed by an apparatus including encrypting plaintext data based on an encryption key to generate first ciphertext data, applying a noise vector being periodically extracted to an artificial intelligence-based generative model to generate a first signature code and a second signature code, and applying the first signature code and the second signature code to the first ciphertext data to generate second ciphertext data. The generating of the first signature code may include determining a type and a replacement location of a character necessary to generate the first signature code by means of a predetermined conversion formula and generating a first character, which is obtained by calculating an existing encryption character being present at the replacement location in the first ciphertext data and the character in a predetermined scheme, as the first signature code. The generating of the second signature code may include determining a type and an insertion location of a second character to be used as the second signature code by means of the conversion formula. The generating of the second ciphertext data may include replacing the existing encryption character being present at the replacement location in the first ciphertext data with the first character and inserting the second character into the insertion location in the first ciphertext data to generate the second ciphertext data.

In accordance with another aspect of the inventive concept, there is provided an apparatus including a memory, an acquisition unit that obtains plaintext data, and a processor that encrypts the plaintext data based on an encryption key to generate first ciphertext data, applies a noise vector being periodically extracted to an artificial intelligence-based generative model to generate a first signature code and a second signature code, and applies the first signature code and the second signature code to the first ciphertext data to generate second ciphertext data. The processor may determine a type and a replacement location of a character necessary to generate the first signature code by means of a predetermined conversion formula, when generating the first signature code, and may generate a first character, which is obtained by calculating an existing encryption character being present at the replacement location in the first ciphertext data and the character in a predetermined scheme, as the first signature code, may determine a type and an insertion location of a second character to be used as the second signature code by means of the conversion formula, when generating the second signature code, and may replace the existing ciphertext character being present at the replacement location in the first ciphertext data with the first character, when generating the second ciphertext data, and may insert the second character into the insertion location in the first ciphertext data to generate the second ciphertext data.

The other details of the inventive concept may be included in the detailed description and the drawings.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIGS. 7A and 7B are drawings illustrating encoding a noise vector to generate a first input value and a second input value, according to an embodiment of the inventive concept;

FIG. 10A is a drawing illustrating determining replacement locations in first ciphertext data for respective characters constituting a first signature code, according to an embodiment of the inventive concept;

FIG. 10B is a drawing illustrating a character type code table, according to an embodiment of the inventive concept;

FIG. 10C is a drawing illustrating determining insertion locations in first ciphertext data for respective characters constituting a second signature code, according to an embodiment of the inventive concept;

DETAILED DESCRIPTION

Figure 1A:
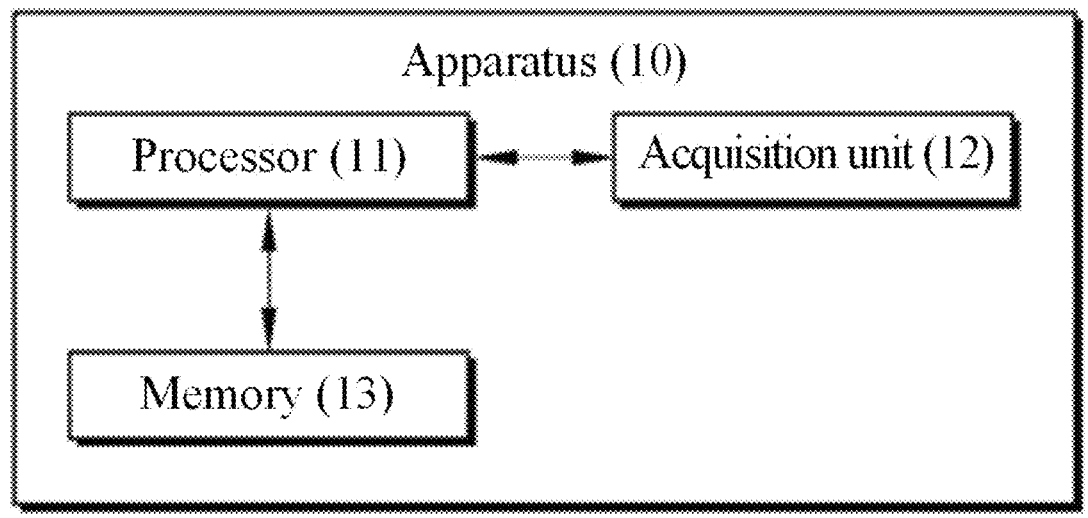
FIG. 1A is a block diagram schematically illustrating a configuration of a data encryption apparatus using post-quantum cryptography based on artificial intelligence, according to an embodiment of the inventive concept.

The above and other aspects, features and advantages of the invention will become apparent from the following description of the following embodiments given in conjunction with the accompanying drawings. However, the inventive concept is not limited to the embodiments disclosed below, but may be implemented in various forms. The embodiments of the inventive concept are provided to make the disclosure of the inventive concept complete and fully inform those skilled in the art to which the inventive concept pertains of the scope of the inventive concept.

The terms used herein are provided to describe the embodiments but not to limit the inventive concept. In the specification, the singular forms include plural forms unless particularly mentioned. The terms "comprises" and/or "comprising" used herein does not exclude presence or addition of one or more other elements, in addition to the aforementioned elements. Throughout the specification, the same reference numerals dente the same elements, and "and/or" includes the respective elements and all combinations of the elements. Although "first", "second" and the like are used to describe various elements, the elements are not limited by the terms. The terms are used simply to distinguish one element from other elements. Accordingly, it is apparent that a first element mentioned in the following may be a second element without departing from the spirit of the inventive concept.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Hereinafter, exemplary embodiments of the inventive concept will be described in detail with reference to the accompanying drawings.

Many existing companies or security companies use a prefix or postfix scheme, which encrypts plaintext data including personal information to generate ciphertext data and includes information about encryption context (e.g., an encryption key, an encryption algorithm, or the like) in a prefix or postfix portion of the ciphertext data, as an encryption scheme.

However, because such an encryption scheme is now commonly used for encryption, although a third party does not participate or intervene in the encryption process, it is possible for him or her to easily infer that information associated with the encryption is included in a prefix or postfix portion of ciphertext or cipher data. In other words, the prefix scheme and the postfix scheme associated with the encryption scheme currently have a security vulnerability.

To address such a problem, an embodiment of the inventive concept may insert encryption context information into the inside of the ciphertext data rather than the prefix or postfix portion of the ciphertext data. In addition, in generating a character or code including the encryption context information, an embodiment of the inventive concept may use an artificial intelligence-based generative model such that the third party does not infer regularity. Hereinafter, a description will be given in detail of an embodiment of the inventive concept with reference to the accompanying drawings.

Figure 1B:
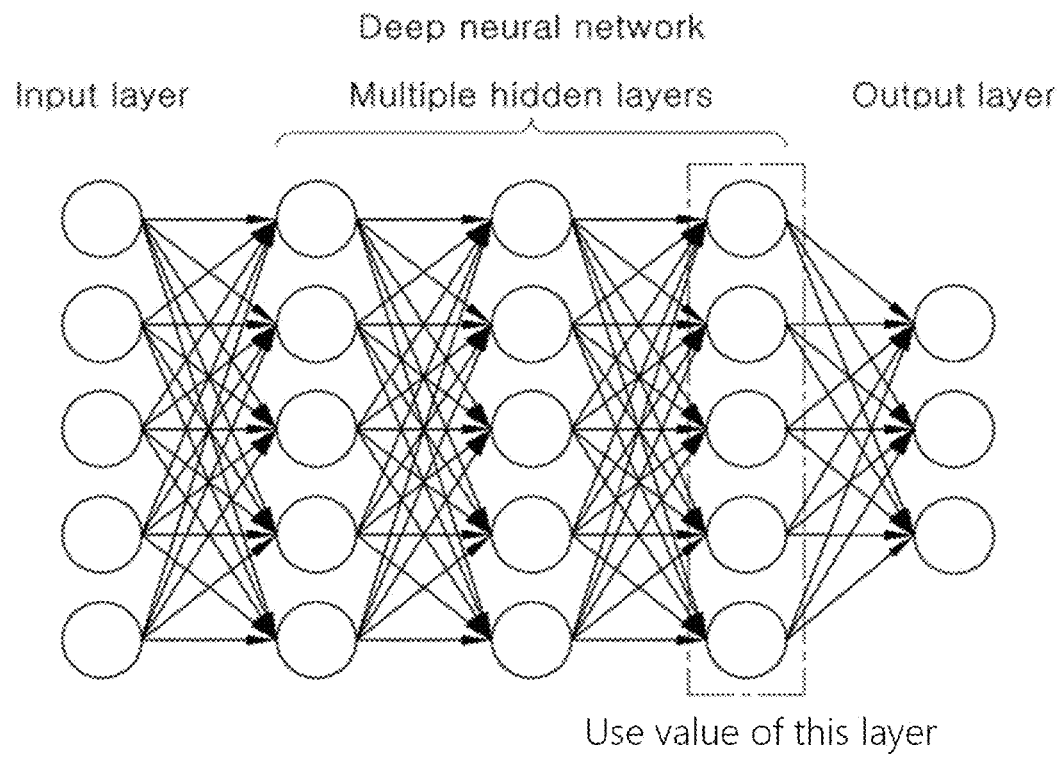
FIG. 1B is a drawing for describing an encryption code generation model based on artificial intelligence, according to an embodiment of the inventive concept.

FIG. 1A is a block diagram schematically illustrating a configuration of a data encryption apparatus 10 using post-quantum cryptography based on artificial intelligence, according to an embodiment of the inventive concept. FIG. 1B is a drawing for describing an encryption code generation model based on artificial intelligence, according to an embodiment of the inventive concept.

Referring to FIG. 1A, an apparatus 10 may include a memory 13, an acquisition unit 12, and a processor 11. However, in some embodiments, the apparatus 10 may include less or more components than the components shown in FIG. 1A. Herein, the apparatus 10 may be a computing device, which may correspond to a server device.

First of all, the acquisition unit 12 may receive plaintext data including personal information from a user. Alternatively, the acquisition unit 12 may receive a random noise vector for generating a first input value and a second input value from the user or may obtain a random noise vector in a predetermined noise vector network.

Meanwhile, the processor 11 may encrypt the plaintext data based on an encryption key to generate first ciphertext data and may encode the random noise vector based on an artificial intelligence-based generative model to generate the first input value and the second input value.

Thereafter, the processor 11 may convert the first input value into a first signature code based on a predetermined signature code conversion table and may convert the second input value into a second signature code based on the signature code conversion table.

The processor 11 may replace or insert the first signature code and the second signature code into the first ciphertext data to generate second ciphertext data.

The memory 13 may store an algorithm about the artificial intelligence-based generative model, an encryption key used in an encryption process, an encryption algorithm, or the like.

Herein, a signature code including the first signature code and the second signature code may be an independent-type cipher code generated by means of the artificial intelligence-based generative model according to an embodiment of the inventive concept.

Hereinafter, an entity which performs data encryption may be understood as, but not limited to, the apparatus 10 using the artificial intelligence-based generative model operated by the user, which is described above. Meanwhile, the apparatus 10 may be understood as, but not limited to, a server computer operated by the user, which performs data encryption.

Hereinafter, the operation of the processor 11 may be the same as that of the apparatus 10.

Figure 2:
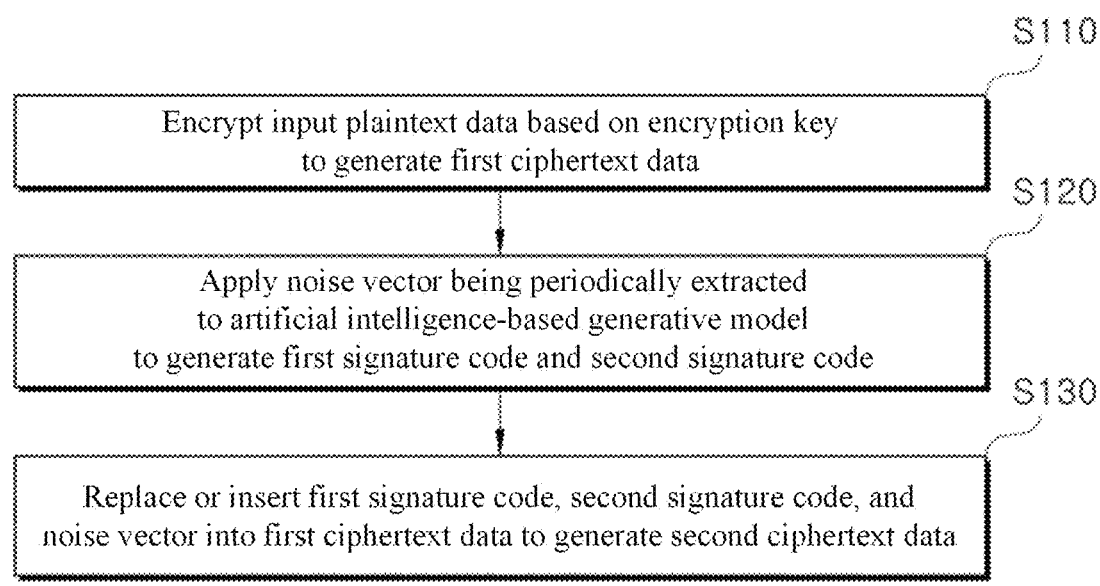
FIG. 2 is a flowchart schematically illustrating a data encryption method using post-quantum cryptography based on artificial intelligence, according to an embodiment of the inventive concept.

FIG. 2 is a flowchart schematically illustrating a data encryption method using an encryption code generation model based on artificial intelligence, according to an embodiment of the inventive concept.

First of all, referring to FIG. 2, in operation S110, a processor 11 of FIG. 1A may encrypt input plaintext data based on an encryption key to generate first ciphertext data.

In detail, when receiving the plaintext data including personal information from a user, the processor 11 may perform encryption by using an encryption key or applying a unidirectional or bidirectional cipher algorithm depending on a previous setting.

For example, SHA512, AES256, SEED128, ARIA256, or the like may be used as the cipher algorithm, but not limited thereto. Any cipher algorithm which is well known in a technical field to which the inventive concept pertains may be used as the cipher algorithm. In this case, specification information about an encrypted plaintext, for example, an encryption algorithm scheme, a key index, or the like other than plaintext may be included in the first ciphertext.

Figure 3:
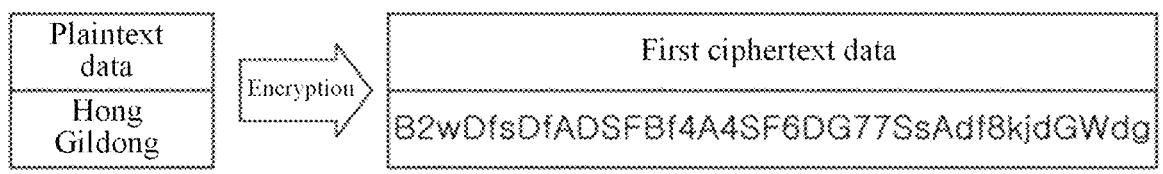
FIG. 3 is a drawing illustrating encrypting plaintext data including personal information into first ciphertext using an encryption key, according to an embodiment of the inventive concept.

FIG. 3 is a drawing illustrating encrypting plaintext data including personal information into first ciphertext using an encryption key, according to an embodiment of the inventive concept.

Referring to FIG. 3, when plaintext data, "Hong Gildong", including personal information about a name of a specific person, is received from a user, a processor 11 of FIG. 1A may encrypt the plaintext data depending on a certain cipher algorithm to generate first ciphertext data, "B2wDfsDfADSFBf4A4SF6DG77SsAdf8kjdGWdg".

Meanwhile, referring again to FIG. 2, after generating the first ciphertext data, in operation S120, the processor 11 may apply a noise vector being periodically extracted to an artificial intelligence-based generative model to generate a first signature code and a second signature code.

Herein, when generating the first signature code and the second signature code, for pieces of plaintext data which belong to the same period, the processor 11 may generate the first signature code and the second signature code based on the same noise vector.

In detail, the processor 11 may determine a type and a replacement location of a character necessary to generate the first signature code by means of a predetermined conversion formula and may generate a first character, which is obtained by calculating an existing encryption character which is present at the replacement location in the first ciphertext data and the character in a predetermined scheme, as the first signature code.

Furthermore, the processor 11 may determine a type and an insertion location of a second character to be used as the second signature code by means of the conversion formula.

In detail, the processor 11 may extract a noise vector on a system in which an apparatus 10 of FIG. 1A is installed. However, an embodiment of the inventive concept is not limited thereto. The processor 11 may receive information about a random noise vector through an acquisition unit 12 of FIG. 1A from the user.

Meanwhile, as an embodiment of the inventive concept, the noise vector may be extracted based on a random number generated based on system information of a computer, that is, hardware. For example, the processor 11 may use a random number generated based on a temperature, a time point, or the like of hardware as the above-mentioned noise vector. To this end, a memory 13 of FIG. 1A may store a program which generates any random number.

The extracted noise vector may be used to generate a signature code. In detail, the processor 11 may input the noise vector to an artificial intelligence-based generative model to generate a first input value and a second input value and may convert the first input value and the second input value into the first signature code and the second signature code, respectively.

Hereinafter, a description will be given in detail of a method for generating the first signature code and the second signature code in operation S120 with reference to FIGS. 4 to 8B.

Figure 4:
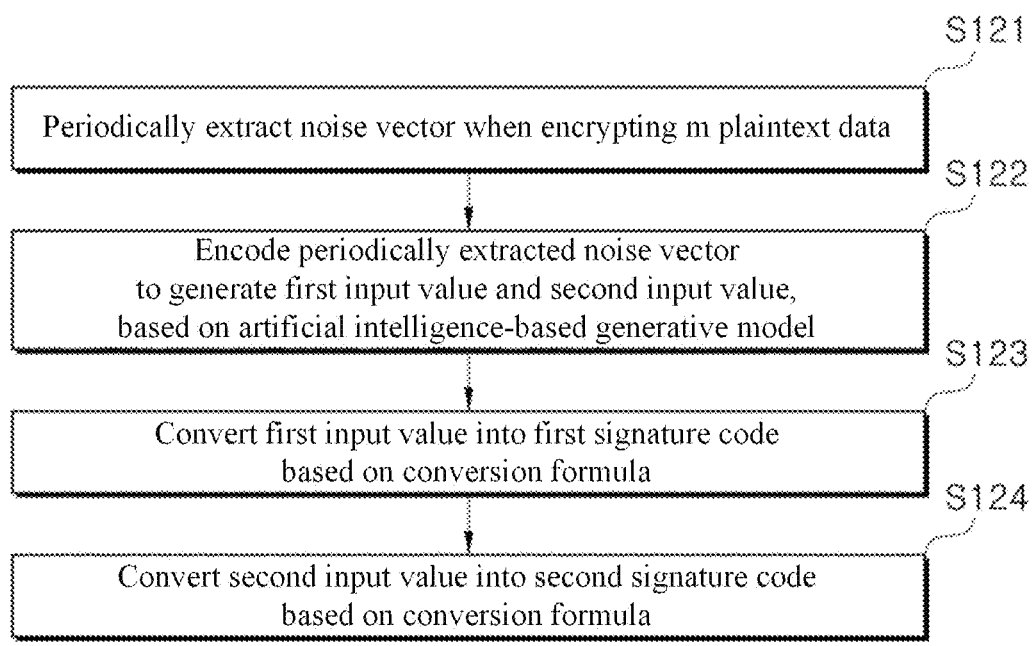
FIG. 4 is a flowchart schematically illustrating a method for generating a first signature code and a second signature code, according to an embodiment of the inventive concept.
Figure 5:
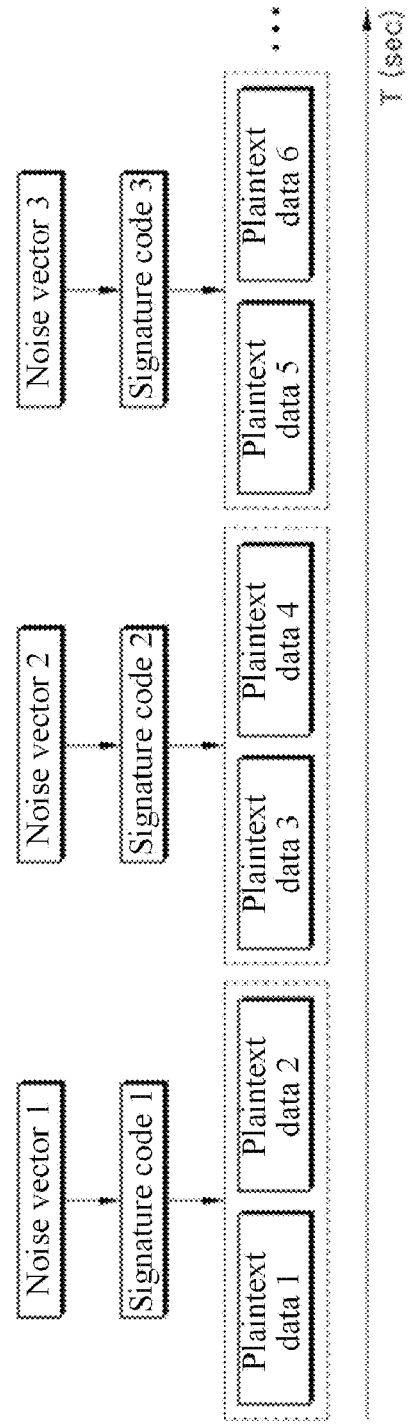
FIG. 5 is a drawing illustrating periodically extracting a noise vector, according to an embodiment of the inventive concept.
Figure 6A:
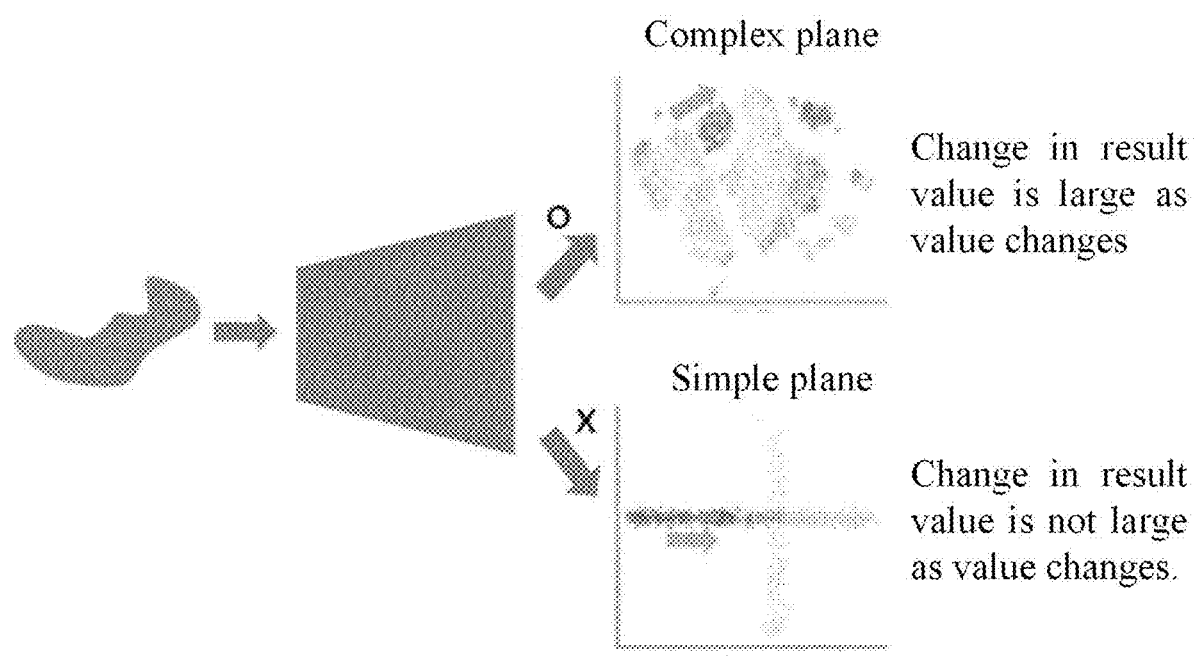
FIG. 6A is a drawing for describing an artificial intelligence-based generative model, according to an embodiment of the inventive concept.
Figure 6B:
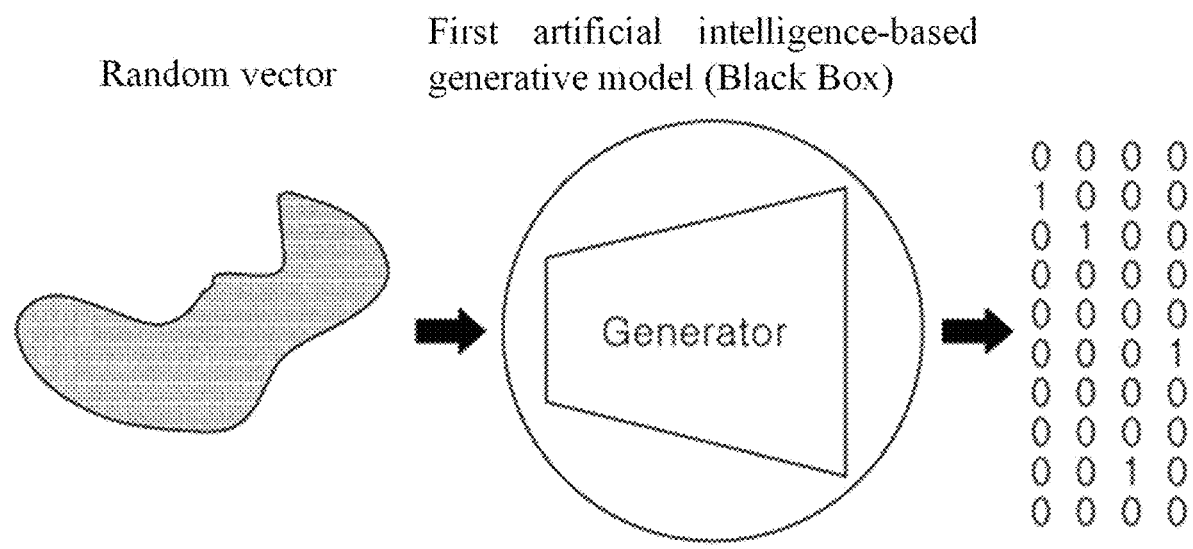
FIGS. 6B and 6C are drawings illustrating encoding a noise vector using an artificial intelligence-based generative model, according to an embodiment of the inventive concept.
Figure 6C:
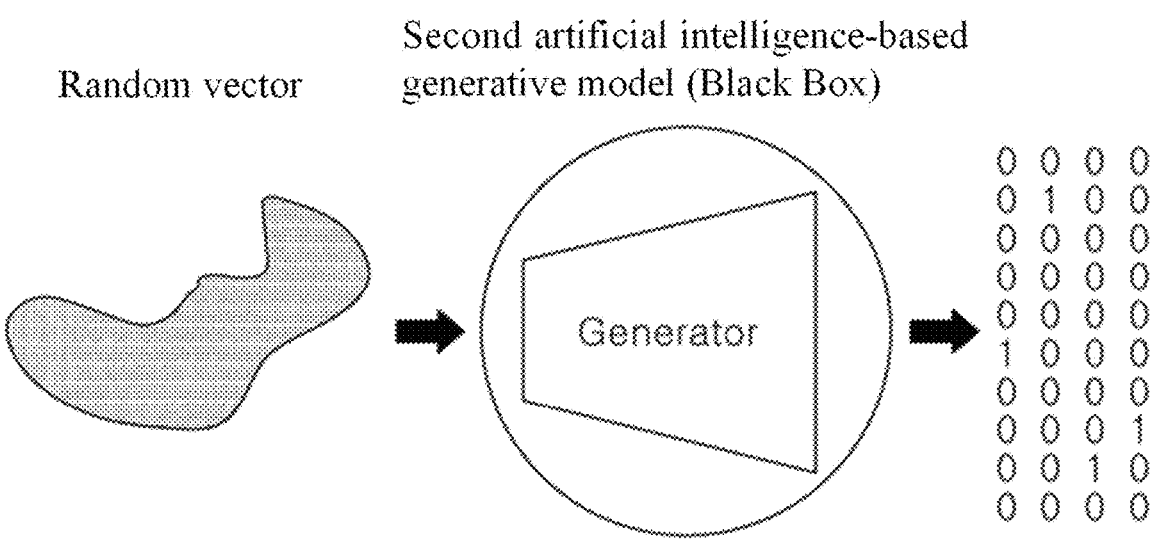
Figure 8A:
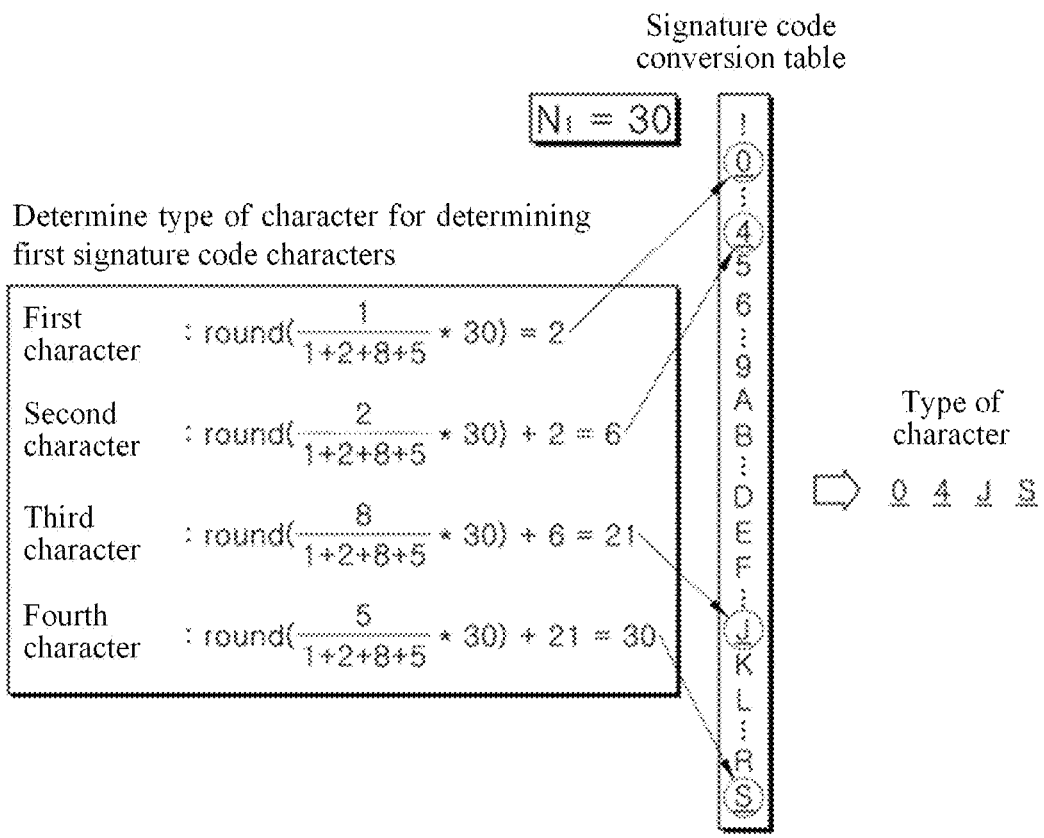
FIGS. 8A and 8B are drawings illustrating a method for generating respective characters constituting a first signature code and a second signature code, according to an embodiment of the inventive concept.
Figure 8B:
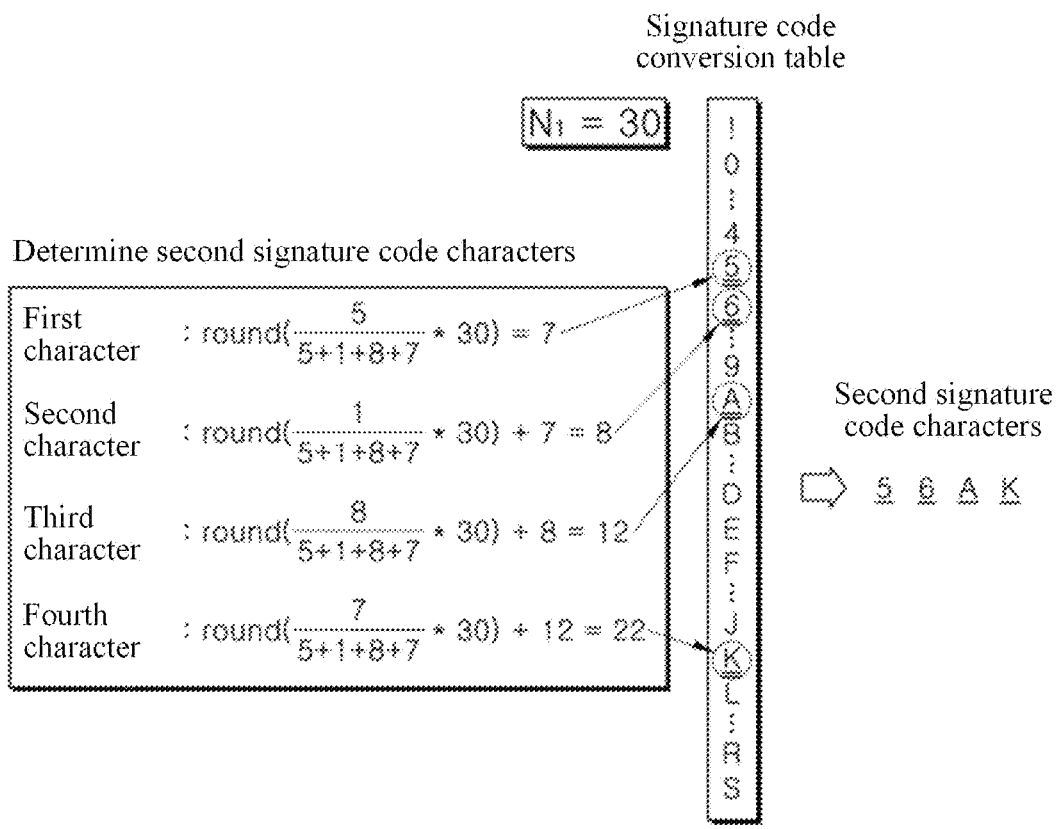

FIG. 4 is a flowchart schematically illustrating a method for generating a first signature code and a second signature code, according to an embodiment of the inventive concept. FIG. 5 is a drawing illustrating periodically extracting a noise vector, according to an embodiment of the inventive concept. FIG. 6A is a drawing for describing an artificial intelligence-based generative model, according to an embodiment of the inventive concept. FIGS. 6B and 6C are drawings illustrating encoding a noise vector using an artificial intelligence-based generative model, according to an embodiment of the inventive concept. FIGS. 7A and 7B are drawings illustrating encoding a noise vector to generate a first input value and a second input value, according to an embodiment of the inventive concept. FIGS. 8A and 8B are drawings illustrating a method for generating respective characters constituting a first signature code and a second signature code, according to an embodiment of the inventive concept.

First of all, referring to FIG. 4, in operation S121, a processor 11 of FIG. 1A may periodically extract a noise vector whenever encrypting m (where m is a natural number) plaintext data.

Referring to FIG. 5, assuming that m is 2, the processor 11 may extract the same noise vector from plaintext data 1 which is first input and plaintext data 2 which is second input to generate a signature code. In detail, when plaintext data 1 is input, the processor 11 may extract noise vector 1 to generate a signature code and may store information about noise vector 1 in a memory 13 of FIG. 1A. When plaintext data 2 is input, the processor 11 may not extract a new noise vector, may extract the information about noise vector 1, which is used when generating a first signature code or a second signature code of plaintext data 1, and may generate the first signature code or the second signature code based on the information.

Likewise, plaintext data 3 which is thirdly input and plaintext data 4 which is fourthly input may be used such that the same noise vector 2 generates the first signature code or the second signature code, and plaintext data 5 which is fifthly input and plaintext data 6 which is sixthly input may be used such that the same noise vector 3 generates the first signature code or the second signature code. In other words, the pieces of plaintext data which belong to the same period may use the same noise vector.

Referring again to FIG. 4, in operation S122, the processor 11 may encode the periodically extracted noise vector to generate a first input value and a second input value, based on an artificial intelligence-based generative model.

In detail, the noise vector may be encoded using the artificial intelligence-based generative model. For example, the processor 11 may convert the noise vector into, but not limited to, a binary vector by means of one-hot encoding. Meanwhile, because the above-mentioned process of encoding the noise vector uses the artificial intelligence-based generative model (a black box), an effect is shown such that the third party is unable to infer or recognize inherent regularity in the process of encoding the noise vector.

Referring to FIG. 6A, a post-quantum encryption source technology (a dynamic signature) may make the most complex plane, using a neural network output where it is able to use a location selection scheme independently of a character type.

Referring to FIG. 6B, the processor 11 may generate a random noise vector, obtained by means of one-hot encoding based on a first artificial intelligence-based generative model (a black box), as four binary vectors, [0 1 0 0 0 0 0 0 0 0], [0 0 1 0 0 0 0 0 0 0], [0 0 0 0 0 0 0 0 1 0], [0 0 0 0 0 1 0 0 0 0]. Although not clearly illustrated in the drawing, the processor 11 may extract four random vectors to generate the four binary vectors.

Furthermore, referring to FIG. 6C, the processor 11 may generate a random noise vector, obtained by means of one-hot encoding based on a second artificial intelligence-based generative model (a black box), as four binary vectors, [0 0 0 0 0 1 0 0 0 0], [0 1 0 0 0 0 0 0 0 0], [0 0 0 0 0 0 0 1 0], [0 0 0 0 0 0 0 1 0 0]. Although not clearly illustrated in the drawing, the processor 11 may extract four random vectors to generate the four binary vectors.

Meanwhile, after encoding the noise vector, the processor 11 may generate a first input value and a second input value.

For example, referring to FIG. 7A, the processor 11 may encode the noise vector into four one-hot vectors, based on the artificial intelligence-based generative model, and may generate the first input value based on the one-hot vectors. Referring to FIG. 4, the processor 11 may convert the respective one-hot vectors into respective numbers and may generate the first input value configured with the converted numbers. Referring to FIG. 4, the processor 11 may generate the first input value of "1285", based on four binary vectors, [0 1 0 0 0 0 0 0 0 0], [0 0 1 0 0 0 0 0 0 0], [0 0 0 0 0 0 0 1 0], [0 0 0 0 1 0 0 0 0].

At this time, the processor 11 may generate the first input value using the respective numbers converted from the respective one-hot vectors, based on an order where the noise vectors are input or an order where one-hot vectors generated by encoding the noise vectors are generated. For example, "1" generated by conversion of a vector, [0 1 0 0 0 0 0 0 0 0], which is first generated among four vectors, [0 1 0 0 0 0 0 0 0 0], [0 0 1 0 0 0 0 0 0 0], [0 0 0 0 0 0 0 0 1 0], [0 0 0 0 1 0 0 0 0], corresponds to a first digit value of the first input value.

Referring to FIG. 7B, the processor 11 may encode the noise vector into four one-hot vectors, based on the artificial intelligence-based generative model, and may generate the second input value based on the one-hot vectors. Referring to FIG. 4, the processor 11 may convert the respective one-hot vectors into respective numbers and may generate the second input value configured with the converted numbers. Referring to FIG. 4, the processor 11 may generate the second input value of "5187", based on four binary vectors, [0 0 0 0 0 1 0 0 0 0], [0 1 0 0 0 0 0 0 0 0], [0 0 0 0 0 0 0 1 0], [0 0 0 0 0 0 0 1 0 0].

At this time, the processor 11 may generate the second input value using the respective numbers converted from the respective one-hot vectors, based on an order where the noise vectors are input or an order where one-hot vectors generated by encoding the noise vectors are generated. For example, "5" generated by conversion of a vector, [0 0 0 0 0 1 0 0 0 0], which is first generated among four vectors, [0 0 0 0 0 1 0 0 0 0], [0 1 0 0 0 0 0 0 0 0], [0 0 0 0 0 0 0 0 1 0], [0 0 0 0 0 0 0 1 0 0], corresponds to a first digit value of the second input value.

Referring again to FIG. 4, in operation S123, the processor 11 may convert the first input value into the first signature code based on the conversion formula. Herein, the conversion formula may include a predetermined signature code conversion table.

In detail, the processor 11 may determine a type of a character corresponding to the first input value and a replacement location of the character in the first ciphertext data, based on the signature code conversion table.

The processor 11 may identify an existing encryption character which is present at the determined replacement location among encryption characters in the first ciphertext data and may generate a first character by calculating the identified existing encryption character and the determined character in a predetermined scheme.

Referring to FIG. 8A, the processor 11 may determine a type of a character corresponding to the first input value based on the first input value and the signature code conversion table.

Herein, assuming that the number of all characters constituting the signature code conversion table is 30, a character corresponding to a first number, "1", of the first input value, "1285", may be determined as follows. First of all, the processor 11 may determine an order where characters to be converted are located in the signature code conversion table by means of Equation 1 below.

Numbers of first input value to be converted/(sum of numbers constituting first input value)×number of all characters constituting signature code conversion table+result values of previous digital values of numbers of first input value to be converted    [Equation 1]

In other words, a first number, "1", of the first input value, "1285", may be converted into a second (1/(1+2+8+5)×30=2) character, "0", in the signature code conversion table.

According to the same method, a second number, "2", of the first input value, "1285", may be converted into a sixth character, "4", in the signature code conversion table, a third number, "8", of the first input value, "1285", may be converted into a 21st character, "J", in the signature code conversion table, and the last number, "5", of the first input value, "1285", may be converted into a 30th character, "S", in the signature code conversion table. As such, the respective numbers constituting the first input value may be converted into respective characters, numbers, signs, or the like.

Herein, the signature code conversion table may refer to a conversion table configured as characters, numbers, signs, or the like constituting a signature code are arranged, based on information about a predefined order which is not duplicated.

The processor 11 may calculate the existing encryption characters, "2", "D", "7", and "d", which are present at the replacement locations in the first ciphertext data, and the characters, "0", "4", "J", and "S" in a predetermined scheme to generate respective first characters constituting the first signature code.

Herein, referring to FIGS. 10A and 10B, the replacement locations may be determined as a second location, a seventh location, a 24th location, and a 36th location in the first ciphertext data. Thereafter, a description will be given in detail with reference to FIGS. 10A and 10B.

Herein, the calculation in the predetermined scheme may include one of four arithmetic operations performed for a sequence number of the determined character in the signature code conversion table and a sequence number of the existing encryption character which is present in the replacement location in the first ciphertext data.

The first character may be a character with a sequence number according to the result of performing the one of the four arithmetic operations for the sequence number of the existing encryption character and the sequence number of the determined character.

As an example, the processor 11 may perform an addition arithmetic operation for the sequence number (e.g., second, seventh, 24th, or 36th) of the determined character in the signature code conversion table and the sequence number (e.g., second, 13th, seventh, or 39th) of the existing encryption character which is present at the replacement location in the first ciphertext data and may determine a sequence number (e.g., fourth, 20th, 31st, or 75th) corresponding to the performed result.

The processor 11 may identify the respective first characters, "4", "R", "V", and "D", constituting the first signature code with reference to a character type code table of FIG. 10 B for a corresponding sequence number. At this time, when the corresponding sequence number is greater than the number of characters of the character type code table, the processor 11 may return to the beginning of the character type code table to sequentially perform addition and may identify the first characters.

Referring again to FIG. 4, in operation S124, the processor 11 may convert the second input value into the second signature code based on the conversion formula.

In detail, referring to FIG. 8B, the processor 11 may determine respective characters constituting the second signature code corresponding to the second input value based on the second input value and the signature code conversion table. Assuming that the number of all characters constituting the signature code conversion table is 30, the processor 11 may determine a second signature code character corresponding to a first number, "5", of the second input value, "5187", as follows. The processor 11 may determine an order where a character to be converted is located in the signature code conversion table by means of Equation 1 above.

In other words, a first number, "5", of the second input value, "5187", may be converted into a seventh (5/(5+1+8+7)×30=7) character, "5", in the signature code conversion table.

According to the same method, a second number, "1", of the second input value, "5187", may be converted into an eighth character, "6", in the signature code conversion table, a third number, "8", of the second input value, "5187", may be converted into a twelfth character, "A", in the signature code conversion table, and the last number, "7", of the second input value, "5187", may be converted into a 22nd character, "K", in the signature code conversion table. In other words, the second signature code may be generated as "56AK". As such, the respective numbers constituting the second input value may be converted into respective characters, number, signs, or the like constituting the second signature code.

Meanwhile, as an example of the inventive concept, the artificial intelligence-based generative model may be a model pre-trained based on a noise vector in a network of multimodal-distribution. In other words, an embodiment of the inventive concept may perform pre-training based on the noise vector in the network of the multimodal-distribution rather than a noise vector in a network having a general normal distribution, thus increasing complexity of a feature space of the result value of the artificial intelligence-based generative model.

In addition, in the pre-training process, an embodiment of the inventive concept may reduce a possibility that the third party will predict a parameter of an artificial intelligence model using drop-out of some hidden layers (or hidden states) of the artificial intelligence-based generative model or a distillation learning scheme and may prevent parameters from being copied.

Furthermore, an embodiment of the inventive concept may perform pre-training depending on a weight of the artificial intelligence-based generative model, which is preset by a user.

Referring again to FIG. 2, in operation S130, when generating the first signature code and the second signature code, the processor 11 may replace or insert the first signature code, the second signature code, and the noise vector into the first ciphertext data to generate second ciphertext data.

Hereinafter, a description will be given of a detailed method for generating the second ciphertext data with reference to FIGS. 9 to 11.

Figure 9:
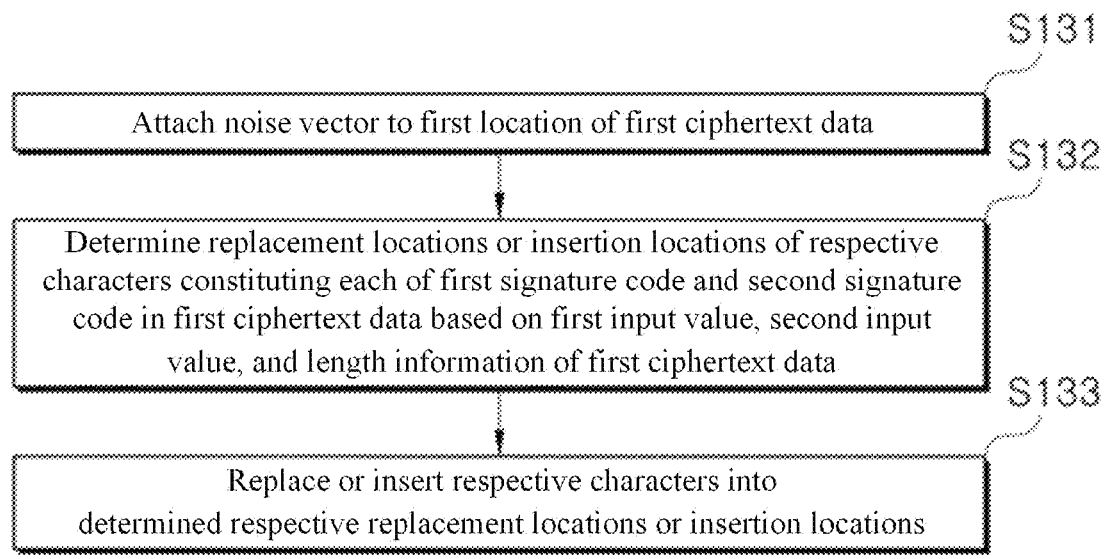
FIG. 9 is a flowchart schematically illustrating a method for generating second ciphertext data, according to an embodiment of the inventive concept.

FIG. 9 is a flowchart schematically illustrating a method for generating second ciphertext data, according to an embodiment of the inventive concept. FIGS. 10A to 10C are drawings illustrating determining replacement locations and insertion locations in first ciphertext data for respective characters constituting a first signature code and a second signature code, according to an embodiment of the inventive concept. FIG. 11 is a drawing illustrating generating second ciphertext data based on a noise value, a first signature code, and a second signature code, according to an embodiment of the inventive concept.

First of all, seeing FIG. 9, as an example of the inventive concept, in operation S131, a processor 11 of FIG. 1A may add a noise vector to a first location of first ciphertext data. Herein, the first location may correspond to a prefix or postfix of the first ciphertext data. Preferably, the processor 11 may follow a postfix scheme which adds the noise vector to the end of the first ciphertext data.

In detail, the processor 11 may convert the extracted noise vector into bytes and may add the converted noise vector to the end of the first ciphertext data. Assuming that four noise vectors are extracted, the processor 11 may convert each of the four noise vectors in a byte format and may add the respective noise vectors to the first ciphertext data in the postfix scheme in an order where the respective noise vectors are extracted.

Seeing FIG. 9 again, in operation S132, the processor 11 may determine replacement locations or insertion locations of the respective characters in the first ciphertext data based on a first input value, a second input value, and length information of the first ciphertext data.

In detail, the processor 11 may generate replacement locations and insertion locations where respective characters, numbers, or signs constituting a first signature code and a second signature code will be replaced or inserted in first ciphertext.

As an example of the inventive concept, the replacement location or the insertion location of the signature code may be determined according to the above-mentioned rate scheme.

For example, referring to FIG. 10A, first of all, a replacement location of a first character, "4", of the first signature code may be determined by Equation 2 below.

Numbers of first input value to determine replacement location/(sum of numbers constituting first input value)×length of first ciphertext data+ result values of previous digit values of numbers of first input value to determine replacement location [Equation 2]

In other words, "4" is replaced with a second (1/(1+2+8+5)×37=2) location in the first ciphertext data. As such, when calculating a replacement location of each of the remaining characters, "R", "V", and "D", constituting the signature code, "R" may be determined as a seventh replacement location in the first ciphertext data, "V" may be a 24th replacement location in the first ciphertext data, and "D" may be a 36th replacement location in the first ciphertext data.

Referring to FIG. 10C, first of all, a replacement location of a first character, "5", of the second signature code may be determined by Equation 2 above.

In other words, "5" is inserted into a ninth (5/(5+1+8+7)×37=9) location in the first ciphertext data. As such, when calculating a replacement location of each of the remaining characters, "6", "A", and "K", constituting the signature code, "6" may be determined as an eleventh replacement location in the first ciphertext data, "A" may be a 25th replacement location in the first ciphertext data, and "K" may be a 37th replacement location in the first ciphertext data.

At this time, in the calculation process using Equation 1 above and Equation 2 above, the processor 11 may determine a location order and an insertion location of a character to be converted in the signature code conversion table using a maximum value less than the value calculated by means of Equation 1 above and Equation 2 above.

Seeing FIG. 9 again, when the replacement locations and the insertion locations of the respective characters constituting the first signature code and the second signature code are determined, in operation S133, the processor 11 may replace or insert the respective characters into the determined replacement locations and the determined insertion locations.

Figure 11:
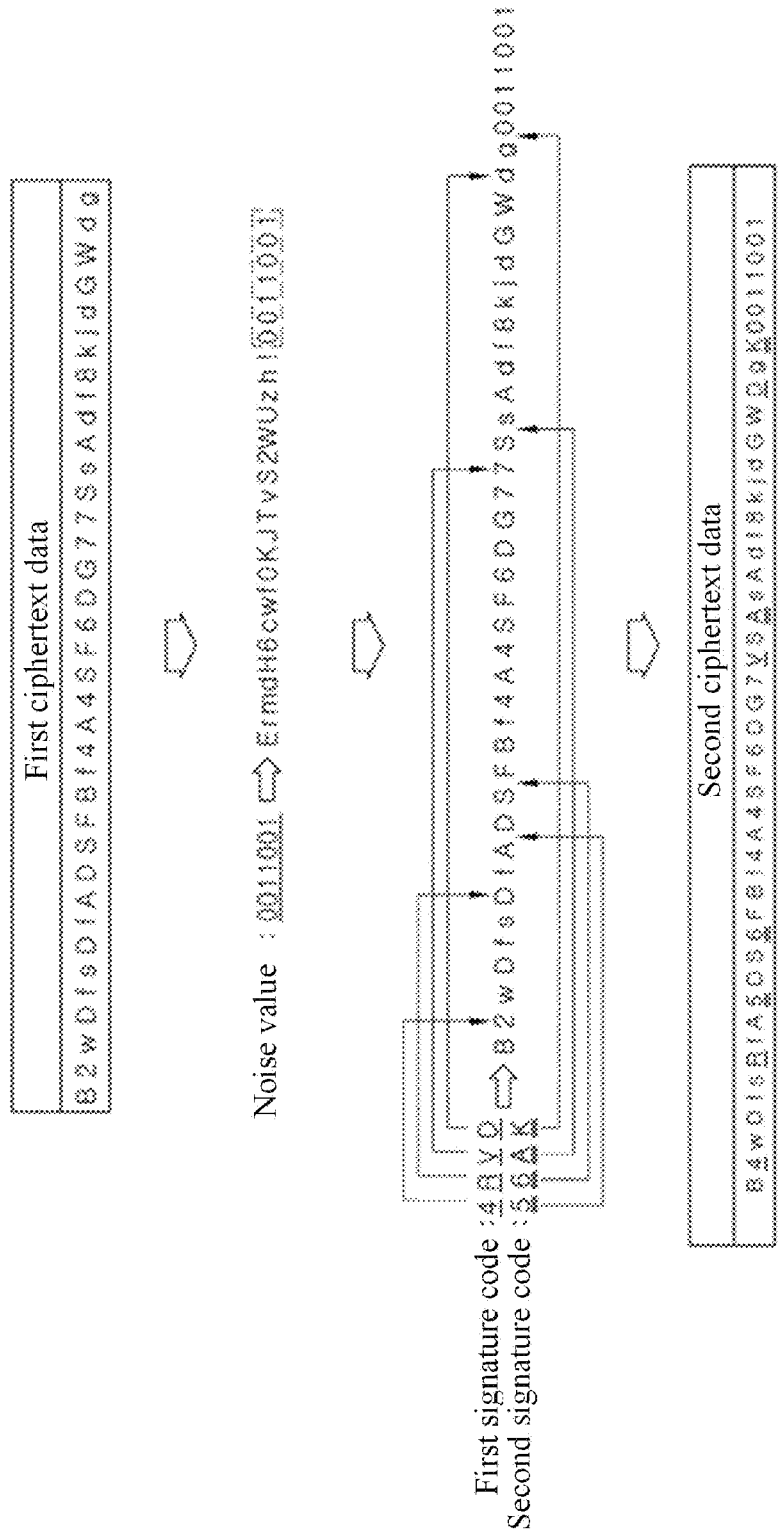
FIG. 11 is a drawing illustrating generating second ciphertext data based on a noise value, a first signature code, and a second signature code, according to an embodiment of the inventive concept.

Referring to FIG. 11, first of all, as described above, in operation S131, the processor 11 may add a value about the noise vector, "0011001", to the first ciphertext data in the postfix scheme. In detail, the processor 11 may add the value about the noise vector to the end of the existing first ciphertext data.

In operation S132, the processor 11 may replace or insert "4", "R", "V", and "D" constituting the first signature code and "5", "6", "A", and "K" constituting the second signature code into the first ciphertext data depending on the determined replacement locations and the determined insertion locations. As a result, the processor 11 may generate second ciphertext data, "B4wDfsRfA5DS6FBf4A4SF6DG7VSAs-Adf8kjdGWDgK011001", in which the noise vector and the signature code are replaced or inserted into the first ciphertext data, "B2wDfsDfADSFBf4A4SF6DG77SsAdf8-kjdGWdg".

Meanwhile, as described above, the processor 11 may generate pieces of plaintext data in the same period as the same signature code using the same noise vector. However, in the process of generating the second ciphertext data, replacement locations or insertion locations of respective characters, numbers, or signs constituting the determined first signature code or the determined second signature code may be based on a length of the first ciphertext data. Although there are pieces of plaintext data in the same period using the same first signature code or the same second signature code, pieces of length information replaced or inserted into pieces of respective first ciphertext data are inevitably different from each other according to the pieces of first ciphertext data generated by the pieces of respective plaintext data FIG. 12 is a drawing illustrating generating second ciphertext data by further using length information of first ciphertext data.

As an example of the inventive concept, in operation S130, a processor 11 of FIG. 1A may add information about a length of first ciphertext data to a second location of the first ciphertext data to generate second ciphertext data. In detail, the second ciphertext data may be generated further based on length information of the first ciphertext data. At this time, the second location to which the length information of the first ciphertext data is attached may be determined not to be duplicated with a first location to which a noise vector is attached. In other words, the value about the noise vector is attached to the first ciphertext data in a postfix scheme, whereas the information about the length of the first ciphertext data may be attached to the first ciphertext data in a prefix scheme.

In other words, as described above, pieces of plaintext data in the same period may be generated as pieces of second ciphertext data, respectively, based on the same signature code generated by the same noise vector. Thus, the same signature code identification key may be attached to the pieces of second ciphertext data respectively corresponding to the pieces of plaintext data in the same period.

Figure 12:
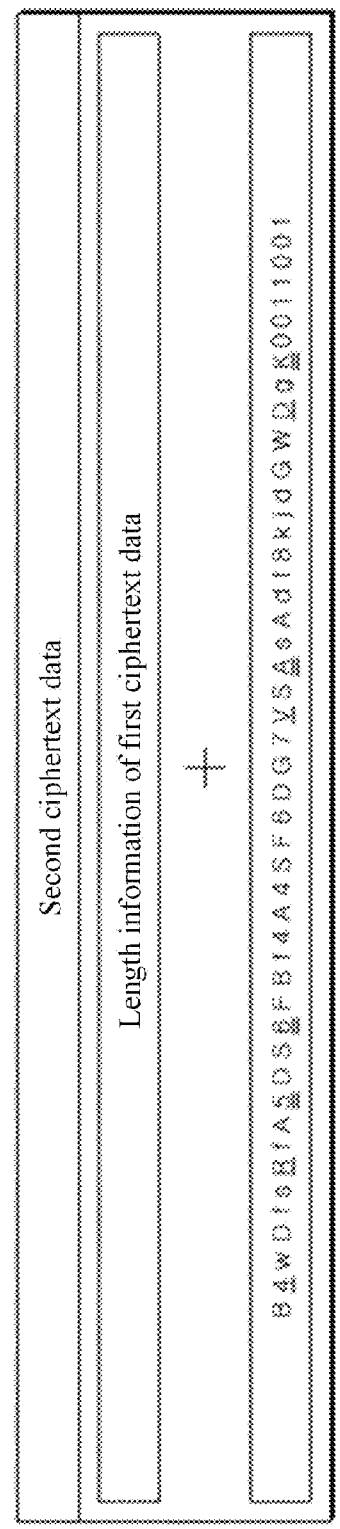
FIG. 12 is a drawing illustrating generating second ciphertext data by further using length information of first ciphertext data and a signature code identification code, according to an embodiment of the inventive concept.

Referring to FIG. 12, after the noise vector is attached, it may be seen that length information of the first ciphertext data is further attached to data into which the characters of each of the first signature code and the second signature code are replaced or inserted. Furthermore, as described above, the length information of the first ciphertext data is inserted into a location which is not duplicated with the value about the noise vector. In detail, it may be seen that the length information of the first ciphertext data is attached to the beginning of the first ciphertext data and the value about the noise vector is attached to the end of the first ciphertext data.

Meanwhile, as an example of the inventive concept, although not clearly illustrated in the drawing, the plaintext data encryption method may further include presetting length information of a signature code. At this time, the generating (S120) of the first input value and the second input value may include extracting noise vectors by a number corresponding to the length information from random noise vectors to generate the first input value and the second input value.

In detail, as described above, it may be seen that one noise vector is encoded into one one-hot vector by an artificial intelligence-based generative model. Referring to FIG. 5, each of the first input value and the second input value generated based on four one-hot vectors may be configured with a 4-digit number. Furthermore, the first signature code may be configured with the number of characters corresponding to the digit number of the first input value, and the second signature code may be configured with the number of characters corresponding to the digit number of the second input value. Thus, the number of characters constituting the first signature code and the second signature code, that is, the length of the first signature code may correspond to the digit number of the first input value and the length of the second signature code may correspond to the digit number of the second input value. Thus, when a user presets length information of each of the first signature code and the second signature code to be replaced or inserted into the first ciphertext data, the processor 11 may extract noise vectors by a number corresponding to the preset length information to generate the first input value and the second input value.

For example, when the length information of the signature code is set to "10", the processor 11 may extract 10 noise vectors, may encode each of the 10 noise vectors to generate 10 one-hot vectors and may generate the first input value and the second input value, each of which is configured with a 10-digit number.

Hereinafter, a description will be given of a method for decrypting second ciphertext data to recover plaintext data with reference to FIG. 13.

Figure 13:
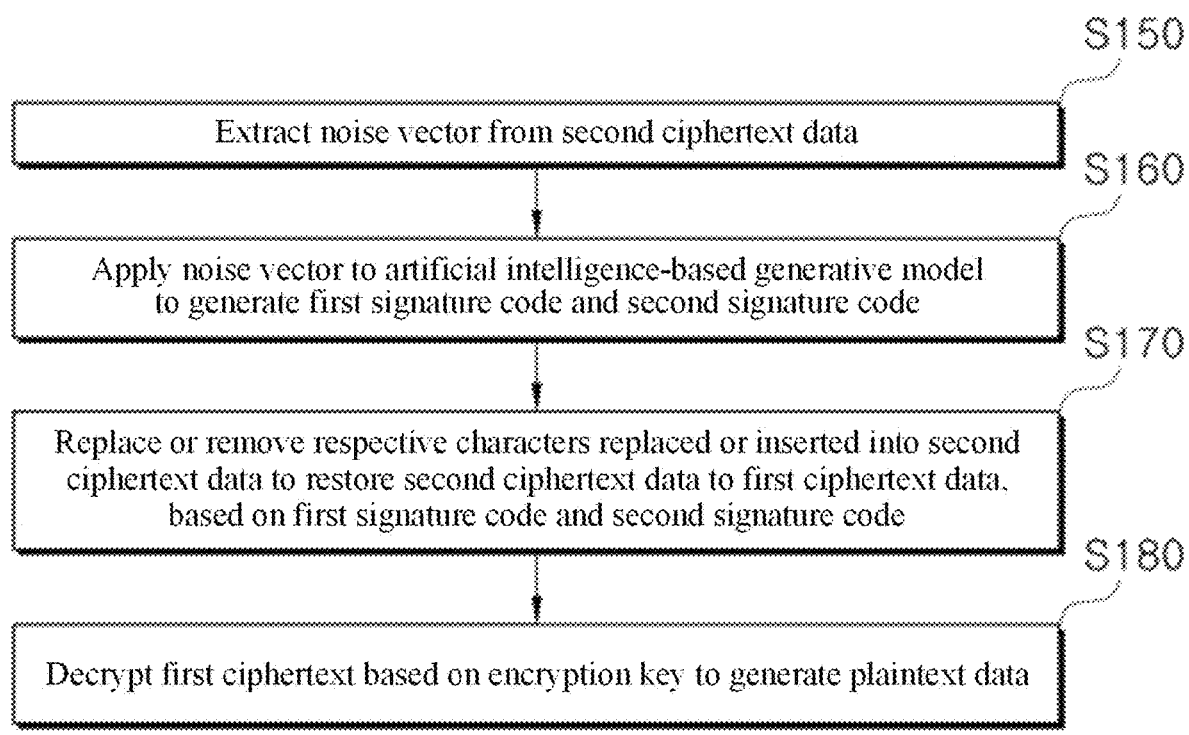
FIG. 13 is a flowchart schematically illustrating a method for decrypting second ciphertext data, according to an embodiment of the inventive concept.

FIG. 13 is a flowchart schematically illustrating a method for decrypting second ciphertext data, according to an embodiment of the inventive concept.

First of all, referring to FIG. 13, in operation S150, a processor 11 of FIG. 1A may extract a noise vector from second ciphertext data. In operation S160, the processor 11 may apply the noise vector to an artificial intelligence-based generative model to generate a first signature code and a second signature code.

After generating the first signature code and the second signature code, in operation S170, the processor 11 may remove respective characters replaced or inserted into the second ciphertext data to restore the second ciphertext data to first ciphertext data, based on the first signature code and the second signature code. In operation S180, the processor 11 may decrypt the first ciphertext data based on an encryption key to generate plaintext data.

At this time, in the generating (S160) of the first signature code and the second signature code, the processor 11 may encode the noise vector extracted from the second ciphertext data to generate a first input value and a second input value, based on the artificial intelligence-based generative model.

The processor 11 may convert the first input value and the second input value into the first signature code and the second signature code, respectively, based on a predetermined signature code conversion table and a predetermined character type code table.

As described above, information about the noise vector used to generate the first signature code and the second signature code may be included in the second ciphertext data.

Thus, when extracting the noise vector and inputting the noise vector to the artificial intelligence-based generative model to generate the second ciphertext data, the processor 11 may generate the first signature code and the second signature code, which are the same as the first signature code and the second signature code, which are replayed or inserted.

To this end, as an example of the inventive concept, to generate the first signature code and the second signature code, which are the same as the first signature code and the second signature code used in the encryption operation, filter information of the artificial intelligence-based generative model may be stored in a memory 13 of FIG. 1A.

Meanwhile, the processor 11 may remove the respective characters replaced or inserted into the second ciphertext data to restore the second ciphertext data to the first ciphertext data, based on the generated first signature code and the generated second signature code.

Referring to FIG. 11, the processor 11 may remove respective characters of the first signature code, "4RVD", and the second signature code, "56AK", which are replaced or inserted into the second ciphertext data, "B4wDfsRfA5DS6FBf4A4SF6DG7VSAsAdf8kjdGWDg-K011001", to restore the second ciphertext data to the first ciphertext data, "B2wDfsDfADSFBf4A4SF6DG77Ss-Adf8kjdGWdg". After storing the second ciphertext data to the first ciphertext data, the processor 11 may extract an encryption key corresponding to an encryption key reference value from the memory 13. The processor 11 may decrypt the first ciphertext data using the extracted encryption key to generate the plaintext data, thus completing decryption.

Furthermore, as an example of the inventive concept, for the second ciphertext data to which the length information of the first ciphertext data is attached, the processor 11 may remove the first signature code and the second signature code, which are replaced or inserted into the second ciphertext data, based on the length information of the first ciphertext data and the noise vector.

In detail, the processor 11 may extract a noise vector added to a first location of the second ciphertext data, for example, the end of the second ciphertext data and may apply the noise vector to the artificial intelligence-based generative model to calculate a first input value and a second input value.

The processor 11 may generate respective characters constituting the first signature code and the second signature code, based on the first input value, the second input value, and a previously stored signature code conversion table. Furthermore, the processor 11 may extract length information of the first ciphertext data added to a second location of the second ciphertext data, for example, the beginning of the second ciphertext data and may determine replacement locations and insertion locations of respective characters constituting the first signature code and the second signature code, which are replaced or inserted into the second ciphertext data, based on the first value and the length information of the first ciphertext data.

The processor 11 may replace or remove the respective characters from the determined replacement locations or the determined insertion locations to restore the second ciphertext data to the first ciphertext data.

Meanwhile, as another example of the inventive concept, the processor 11 may perform decryption based on a caching scheme. In detail, the processor 11 may map and store predetermined n (where n is a natural number) noise vectors and signature codes, may extractor the noise vectors from the second ciphertext data, and may extract the first signature code and the second signature code corresponding to the extracted noise vectors from the memory 13.

The processor 11 may remove respective characters, constituting the first signature code and the second signature code, which are included in the second ciphertext data, using the first signature code and the second signature code. As a result, the processor 11 may more quickly perform the decryption process.

Meanwhile, the predetermined n noise vectors may be periodically changed according to the frequency of the noise vector or the like by a user or the like who provides an encryption and decryption service. However, an embodiment of the inventive concept is not limited thereto.

Meanwhile, the processor 11 may periodically update the second ciphertext data to remove a possibility the second ciphertext data is decrypted and prevent plaintext data from being leaked.

Hereinafter, a description will be given of a method for periodically updating the second ciphertext data.

Figure 14:
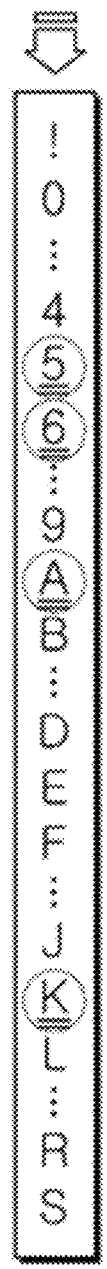
FIG. 14 is a drawing illustrating a method for updating second ciphertext data by adjusting a signature code conversion table, according to an embodiment of the inventive concept.
Figure 14:
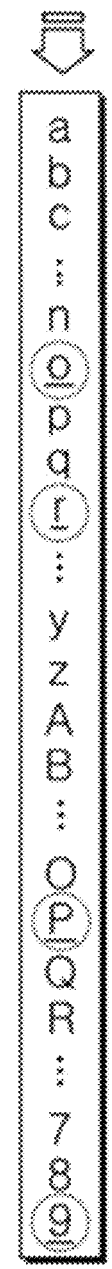

FIG. 14 is a drawing illustrating a method for updating second ciphertext data by changing a signature code conversion table, according to an embodiment of the inventive concept.

First of all, a processor 11 of FIG. 1A may periodically change a first signature code and a second signature code, which are replaced or inserted into the second ciphertext data, to eventually update the second ciphertext data.

Although not clearly illustrated in the drawing, as an example of the inventive concept, the encryption method and the decryption method using the artificial intelligence-based generative model, which are described above, may further include periodically updating the second ciphertext data, based on a signature code conversion table. At this time, the updating of the second ciphertext data may include periodically adjusting a character array in the signature code conversion table and changing the first signature code and the second signature code in the second ciphertext data, based on the adjusted signature code conversion table, to update the second ciphertext data.

Referring to FIG. 14, it may be seen that the first signature code and the second signature code for the first input value, "1285", and the second input value, "5187", which are the same as each other, are differently generated according to adjustment of the character array in the signature code conversion table.

As an example, the first signature code generated based on a first signature code conversion table may be "56AK", whereas the second signature code generated based on a second signature code conversion table may be "orP9".

It may be seen that pieces of second ciphertext data generated as the first signature code and the second signature code are replaced or inserted are also different from each other. As such, the processor 11 may change the first signature code and the second signature code to update the second ciphertext data.

The first signature code and the second signature code may correspond to the first input value and the second input value, respectively. Therefore, the update of the second ciphertext data by means of the change in the signature code conversion table should be performed by the first input value and the second input value, which are the same as each other. Thus, as an example of the inventive concept, the processor 11 may extract noise vectors attached to pieces of respective second ciphertext data and may generate the first input value and the second input value by means of the artificial intelligence-based generative model.

Meanwhile, as an example of the inventive concept, the updating of the second ciphertext data may include collectively updating pieces of second ciphertext data which belong to the same period.

Meanwhile, as another example of the inventive concept, the second ciphertext data may be updated based on re-training of the artificial intelligence-based generative model.

In detail, the processor 11 may periodically change distribution information of the noise vector to re-train the artificial intelligence-based generative model, in conjunction with pre-training of the artificial intelligence-based generative model, thus adjusting a weight of a hidden layer (or a hidden state) of the generative model. The processor 11 may generate a new first input value (hereinafter referred to as a "1-1st input value") and a new second input value (hereinafter referred to as a "2-1st input value"), based on the adjusted weight. The processor 11 may convert the 1-1st input value and the 2-1st input value into a new first signature code (hereinafter referred to as a "1-1st signature code") and a new second signature code (hereinafter referred to as a "2-1st signature code") and may replace or insert the 1-1st signature code and the 2-1 signature code into the first ciphertext data to periodically update the second ciphertext data.

In other words, the method for updating the second ciphertext data by adjusting the signature code conversion table is performed based on the first input value and the second input value, which are the same as each other, whereas the update method through the re-training of the artificial intelligence-based generative model may be performed based on the first input value different from the first input value used at the time of generating the ciphertext and the second input value different from the second input value used at the time of generating the ciphertext. Meanwhile, filter information of the artificial intelligence-based generative model according to the re-training and information about the weight of the hidden layer may be stored in a memory 13 of an apparatus 10 of FIG. 1A.

Meanwhile, as an example of the inventive concept, the updating of the second ciphertext data may be performed after decrypting the second ciphertext data.

Meanwhile, in the above-mentioned description, operations S110 to S180 may be further divided into additional operations or may be combined into fewer operations, according to an implementation example of the inventive concept. Furthermore, some operations may be omitted if necessary, and an order between operations may be changed. In addition, although there are other omitted contents, the contents of FIG. 1 described above are also applicable to the encryption and decryption method based on the artificial intelligence in FIGS. 2 to 11.

The above-mentioned encryption and decryption method based on the artificial intelligence according to the inventive concept may be implemented as a program (or application) to be combined with a computer which is hardware to be executed and may be stored in a computer-readable storage medium.

In some embodiments, the above-discussed method of FIGS. 2, 4, 9 and 13 according to this disclosure, is implemented in the form of program being readable through a variety of computer means and be recorded in any non-transitory computer-readable medium. Here, this medium, in some embodiments, contains, alone or in combination, program instructions, data files, data structures, and the like. These program instructions recorded in the medium are, in some embodiments, specially designed and constructed for this disclosure or known to persons in the field of computer software. For example, the medium includes hardware devices specially configured to store and execute program instructions, including magnetic media such as a hard disk, a floppy disk and a magnetic tape, optical media such as CD-ROM (Compact Disk Read Only Memory) and DVD (Digital Video Disk), magneto-optical media such as floptical disk, ROM, RAM (Random Access Memory), and flash memory. Program instructions include, in some embodiments, machine language codes made by a compiler compiler and high-level language codes executable in a computer using an interpreter or the like. These hardware devices are, in some embodiments, configured to operating as one or more of software to perform the operation of this disclosure, and vice versa.

A computer program (also known as a program, software, software application, script, or code) for the above-discussed method of FIGS. 2, 4, 9 and 13 according to this disclosure is, in some embodiments, written in a programming language, including compiled or interpreted languages, or declarative or procedural languages. A computer program includes, in some embodiments, a unit suitable for use in a computing environment, including as a stand-alone program, a module, a component, or a subroutine. A computer program is or is not, in some embodiments, correspond to a file in a file system. A program is, in some embodiments, stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program is, in some embodiments, deployed to be executed on one or more computer processors located locally at one site or distributed across multiple remote sites and interconnected by a communication network.

According to the disclosed embodiment, the data encryption apparatus using the artificial intelligence post-quantum cryptography may disable the third party to infer or recognize data about encryption information included in ciphertext data.

Furthermore, the data encryption apparatus using the artificial intelligence post-quantum cryptography may remove regularity indicated in the encryption process through the artificial intelligence-based encryption process and may periodically update ciphertext data, thus reinforcing the security of the ciphertext data.

Although the exemplary embodiments of the inventive concept have been described with reference to the accompanying drawings, it will be understood by those skilled in the art to which the inventive concept pertains that the inventive concept can be carried out in other detailed forms without changing the technical spirits and essential features thereof. Therefore, the above-described embodiments are exemplary in all aspects, and should be construed not to be restrictive.

What is claimed is:

1. A computer implemented data encryption method using artificial intelligence post-quantum cryptography and one or more hardware processors the data encryption method being performed by an apparatus using the one or more hardware processors and comprising:
    encrypting plaintext data based on an encryption key to generate first ciphertext data;
    applying a noise vector being periodically extracted to an artificial intelligence-based generative model to generate a first signature code and a second signature code; and
    applying the first signature code and the second signature code to the first ciphertext data to generate second ciphertext data,
    wherein the generating of the first signature code includes:
    determining a type and a replacement location of a character necessary to generate the first signature code by means of a predetermined conversion formula and generating a first character, which is obtained by calculating an existing encryption character being present at the replacement location in the first ciphertext data and the character in a predetermined scheme, as the first signature code,
    wherein the generating of the second signature code includes:
    determining a type and an insertion location of a second character to be used as the second signature code by means of the conversion formula, and
    wherein the generating of the second ciphertext data includes:
    replacing, using the one or more hardware processors, the existing encryption character being present at the replacement location in the first ciphertext data with the first character and inserting the second character into the insertion location in the first ciphertext data to generate the second ciphertext data.

2. The data encryption method of claim 1, wherein the generating of the first signature code and the second signature code includes:
    periodically extracting the noise vector whenever encrypting m (where m is a natural number) plaintext data;
    encoding the periodically extracted noise vector to generate a first input value and a second input value, based on the artificial intelligence-based generative model;
    converting the first input value into the first signature code based on the conversion formula; and
    converting the second input value into the second signature code based on the conversion formula.

3. The data encryption method of claim 2, wherein the conversion formula includes a predetermined signature code conversion table, wherein the converting of the first signature code includes:
    determining a type of a character corresponding to the first input value and a replacement location of the character in the first ciphertext data based on the signature code conversion table;
    identifying an existing encryption character being present at the determined replacement location among encryption characters in the first ciphertext data; and
    generating the first character by calculating the identified existing encryption character and the determined character in the predetermined scheme, and wherein the generating of the second ciphertext data includes:
replacing the generated first character at the replacement location in the first ciphertext data to generate the second ciphertext data.

4. The data encryption method of claim 3, wherein the determining of the replacement location includes:
adding the noise vector to a first location of the first ciphertext data; and
determining the replacement location based on the first input value and length information of the first ciphertext data.

5. The data encryption method of claim 3, wherein the calculation in the predetermined scheme includes one of four arithmetic operations performed for a sequence number of the determined character in the signature code conversion table and a sequence number of the existing encryption character being present at the replacement location in the first ciphertext data, and wherein the first character is a character with a sequence number according to the result of performing the one of the four arithmetic operations for the sequence number of the existing encryption character and the sequence number of the determined character.

6. The data encryption method of claim 2, wherein the conversion formula includes a predetermined signature code conversion table, wherein the converting of the second signature code includes:
determining the second character corresponding to the second input value and the insertion location of the second character in the first ciphertext data based on the signature code conversion table, and
wherein the generating of the second ciphertext data includes:
inserting the determined second character into the determined insertion location in the first ciphertext data.

7. The data encryption method of claim 1, wherein the conversion formula includes a predetermined signature code conversion table, further comprising:
periodically updating the second ciphertext data, based on the signature code conversion table, wherein the updating of the second ciphertext data includes:
periodically changing a character array in the signature code conversion table; and
changing the first signature code or the second signature code in the second ciphertext data to update the second ciphertext data, based on the signature code conversion table in which the character array is changed.

8. The data encryption method of claim 1, wherein the artificial intelligence-based generative model is re-trained by periodically changing distribution information of the noise vector, and
wherein the second ciphertext data is periodically updated based on the re-trained artificial intelligence-based generative model.

9. A data encryption apparatus using artificial intelligence post-quantum cryptography, the data encryption apparatus comprising:
a memory;
an acquisition unit configured to obtain plaintext data; and
a processor configured to encrypt the plaintext data based on an encryption key to generate first ciphertext data, apply a noise vector being periodically extracted to an artificial intelligence-based generative model to generate a first signature code and a second signature code, and apply the first signature code and the second signature code to the first ciphertext data to generate second ciphertext data, wherein the processor is configured to:
determine a type and a replacement location of a character necessary to generate the first signature code by means of a predetermined conversion formula, when generating the first signature code, and generate a first character, which is obtained by calculating an existing encryption character being present at the replacement location in the first ciphertext data and the character in a predetermined scheme, as the first signature code;
determine a type and an insertion location of a second character to be used as the second signature code by means of the conversion formula, when generating the second signature code;
replace the existing ciphertext character being present at the replacement location in the first ciphertext data with the first character, when generating the second ciphertext data, and insert the second character into the insertion location in the first ciphertext data to generate the second ciphertext data; and wherein the acquisition unit is implemented using one or more hardware processors.

* * * * *